MAGNETIC CORE SWITCHING SYSTEMS

Filed July 22, 1958

Inventor
Claude M. E. Masson
By Ralph B. Stewart
Attorney

United States Patent Office 3,101,416

Patented Aug. 20, 1963

3,101,416

MAGNETIC CORE SWITCHING SYSTEMS

Claude Marie Edmond Masson, Paris, France, assignor to Societe d'Electronique et d'Automatisme, Courbevoie, France Filed July 22, 1958, Ser. No. 750,226
Claims priority, application France July 24, 1957
5 Claims. (Cl. 307—88)

The present invention relates to saturable magnetic core switching devices, for use in computers and data processing and handling systems wherein the information words are coded with binary digits or bits.

An object of the invention is to provide a magnetic core switch operating with respect to a load which may be supplied with electrical current therethrough in accordance with a logical operation of the exclusive OR type. Exclusive OR, as is well known in the logical operation wherefrom it may be determined whether or not in a given plurality of alternatives there exists only one of the said alternatives presenting at any time a predetermined one of its alternative conditions. Considering for instance two alternative conditions, exclusive OR will determine whether or not only one of these two conditions represents the digital value 1, for instance, the other one presenting the digital value 0. By "exclusive OR" it is herein intended a logical operation able not only to determine such a condition but also, when reduced to two alternatives, which is the one which presents such a predetermined digital value 1.

A further object of the invention consequently is to provide a magnetic core switch operating as an exclusive OR operator with discrimination of the direction of current fed to the load in accordance to the relative conditions of the digital control inputs thereof.

A further object of the invention is to provide such an exclusive OR operator with discrimination of the direction of the current fed to a load thereof which may be of advantage in operating read-out and read-in processes in a magnetic core store of the kind wherein each core of a matrix is used as a one-digit store of a word of information, the cores for storing such a word being preferably so related as to define a row in such a store.

Reference will be made to the accompanying drawings, wherein.

Figure 1:
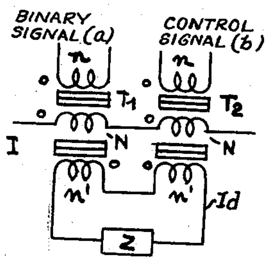
FIG. 1 shows an example of embodiment of a magnetic core current switch according to the invention.

Referring to FIG. 1, a device according to the invention is principally made of one pair of magnetic cores, $T_1$ and $T_2$, each core being provided with three windings, viz a control winding $n$, a load winding $n^1$ and an activation winding N. If and when required, a fourth winding may be further provided on each core for a resetting action thereon, but this fourth winding may often be omitted in actual applications of the switch so that it has not been shown therein.

The control windings $n$ are connected to separate pairs of terminals for the application thereto of separate control signals; let us call $a$ and $b$ these signals and the binary quantities they represent.

The activation (or transfer effecting) windings N are serially connected in the path of an electrical current I, for instance from an input terminal thereto to ground or other fixed potential. These transfer windings N are so provided and interconnected as to have the same direction of action on the magnetic conditions of their respective cores.

The load windings $n^1$ are serially connected with a load impedance Z of substantially constant or predetermined value, but these windings $n^1$ are so provided on their cores that, in the load circuit, the currents they collect are opposed and consequently these windings have also reciprocal actions with respect to their cores.

All inputs of electrical windings are conventionally marked with dots.

The magnetic cores are identical and made of a magnetic material of a substantially rectangular hysteresis loop.

All windings of same denomination have the same number of turns.

Figure 2:
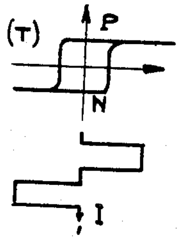
FIGS. 2 and 3 show graphs used for explaining the operation of FIG. 1.
Figure 3:
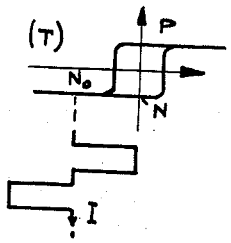

For the purposes of the explanation of operation, it will be first considered that the signals $a$ and $b$ applied to the control windings of $T_1$ and $T_2$ are two-value signals such that, when representing the digital value 0, for instance, they are of one value to bring the cores to a magnetic condition defined by a state of negative remanent induction N, FIGS. 2 and 3. On these graphs, the hysteresis loops are idealized but that does not make any difference in practicing the invention. P is the positive remanent induction point on such a loop. It will then be considered that, when one of the signals $a$ or $b$ represents the digital value 1, it will have a higher value than the value for digital 0 and will bring the magnetic condition of the core to which it is applied to a condition of saturation, $N_0$, more negative than N. It is obvious that, in actual practice, other conventions may be made between the correspondence of the digital values 0 and 1 and these points N and $N_0$ of the magnetic conditions of the cores; and it is also obvious that the switch may also be actuated with a 0 magnetic condition corresponding to P and a 1 magnetic condition corresponding to a state $P_0$ more positive than P.

The activation electrical current I is an intermittent one, and is shown in FIGS. 2 and 3 as comprising at least a first square impulse, of "positive" direction for instance, followed by a complementary "negative" square pulse. Of course, that is not imperative per se and for instance with the application of such a switch to the handling of a magnetic core store, the first part of such a signal, viz a single polarity pulse, will suffice. The graphs only consider two-polarity currents for rendering quite clear that such a switch may operate as well on two-polarity current as on single-polarity current.

When the input current $a$ to the control winding of core $T_1$ is of the higher value thereof, digital value 1 according to the above, the core $T_1$ is brought to $N_0$, FIG. 3. When simultaneously the input signal $b$ to the control winding $n$ of core $T_2$ is at the higher value thereof, digital value 1, the said core $T_2$ will also be brought to $N_0$. Consequently, when the activation current I is applied to the switch, as in FIG. 3, there is only a small change in flux in shifting from $N_0$ to N and no substantial voltage is induced in the load windings $n^1$ and the load Z is not fed by an electrical current from the switch.

When both the signals $a$ and $b$ are at their lower value of current at the same time, both cores $T_1$ and $T_2$ remain at N, FIG. 2, and when the electrical activation current I is applied to the switch, they are both controlled for changing-over their magnetic conditions from N to P, viz to reverse their magnetic states. Since output windings $n'$, $n'$ are connected in opposing relation and have equal numbers of turns, no current will be supplied to the load impedance Z.

But when one of $a$ and $b$, $a$ for instance, is represented by the higher value current, digital value 1, whereas the other signal $b$ for instance, is represented by the lower value of current, digital value 0, the core $T_1$ is at $N_0$ and the core $T_2$ is at N, FIGS. 3 and 2. When the activation current I is applied, then both windings $n^1$ and the load thereacross are fed with a "secondary" current $I_d$ such that $n^1.I_d$ equals $N.I-i_c$ *with* $N=n^1$. When the control conditions are reversed, the signal *a* representing 0 and the signal *b* representing 1, the value of the induced current in the load is the same but with an opposite direction of flow, $-I_d$ if the preceding condition was said to result into $+I_d$. Of course these signs are quite arbitrary per themselves.

The device according to FIG. 1 then actually acts as a three position switch: a rest condition for identical conditions of the cores $T_1$ and $T_2$ and the controls thereof; two work conditions for non-identical conditions of the cores and their controls, with a change-over of the direction of the secondary current from one to the other of the said condition. It is then clear that the device acts as an exclusive OR operator with discrimination of the direction of the difference between the two control quantities.

When used as a logical operator for computing purposes such a device may find applications for instance as a part of a subtractor of digital quantities and, more definitely as follows:

As a subtraction carry-over forming operator, it will act in such a plain way that each time the digit of the quantity B to be subtracted from a corresponding digit of the quantity A is 1 whereas the digit A is 0, a carry-over current will be fed in the load responsive to such a current and the direction of this current. Simultaneously, it will also operate as a non-exclusive OR operator when another load or part of a load is so provided as not to discriminate between the directions of the secondary currents of the device. An apparent arrangement for such a load will for instance comprise three serially connected windings of separate and identical magnetic cores, two of these cores having reversely connected output windings in a further load circuit (this will provide the non-exclusive OR output), the third core defining at the output winding thereof the subtraction carries as obvious.

However, a most interesting application of such a switch will be in the use thereof as a component part for a matrix magnetic core storing arrangement. One knows that such a store is usually made by grouping magnetic cores in rows and columns from serial connection of certain windings of these cores or else, and in a simpler way, of grouping plane assemblies or elementary two-dimension matrices into a three-dimensional one by establishing, through certain interconnections of windings a definite "row" correspondence from two-dimensional matrix to three-dimensional matrix, the number of said matrices being equal to the number of digits or bits in each word of information and the number of cores per matrix being equal to the number of such information words.

Unless some kind of special core arrangement is used, the read-out of any information bit or word in such stores necessitates an "erasing" of the information bit or digit on the selected core or cores, viz an action bringing such core or cores to the 0 representing magnetic condition when it or they was or were not in such a condition. For such a read-out operation, two phases of control are then useful, one applying to a winding of a selected core a variation of magnetic flux tending to bring it in the predetermined magnetic condition marking 0 and, thereafter, a current restoring the initial magnetic condition of the read-out core, viz a current of reverse direction of action on the core each time it is necessary so to do. For a read-in operation, similarly, the first phase "erases" the information on the core or cores concerned therewith and a second phase ensures the recording of the new information on the erased (and consequently read-out) cores.

Figure 4:
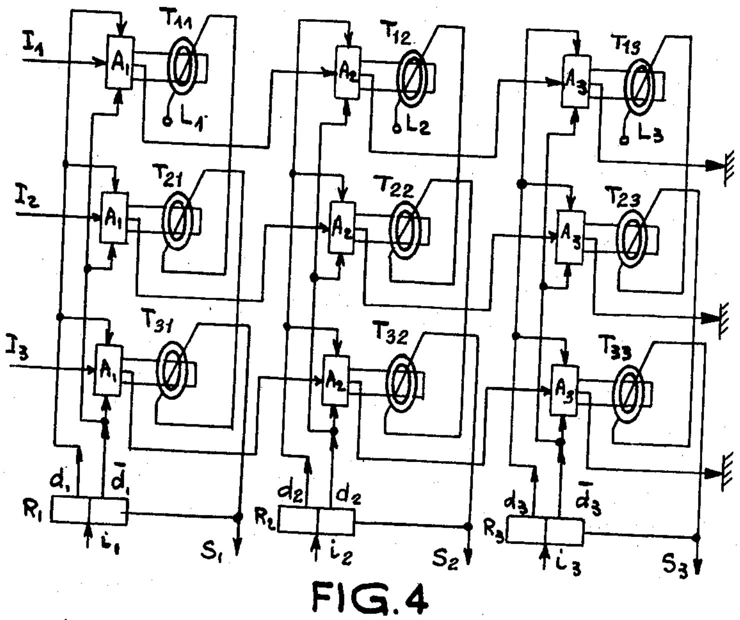
FIG. 4 shows an example of embodiment of a magnetic core matrix store embodying the invention; and, FIG. 5 shows the detail of a row thereof.

In the example shown on FIG. 4, each planar matrix is reduced to a single column, respectively cores $T_{11}$—$T_{21}$—$T_{31}$, $T_{12}$—$T_{22}$—$T_{32}$ and $T_{13}$—$T_{23}$—$T_{33}$. Each word then possesses three digits on three magnetic cores, respectively $T_{11}$, $T_{12}$, $T_{13}$ for the first, $T_{21}$, $T_{22}$, $T_{23}$ for the second and $T_{31}$, $T_{32}$, $T_{33}$ for the third. To the cores of the first column an output circuit is associated which comprises three output windings from the terminal $L_1$ to the output $S_1$, to the cores of the second column is associated a similar circuit from $L_2$ to $S_2$, and to the cores of the third column is associated a similar circuit from $L_3$ to $S_3$.

Figure 5:
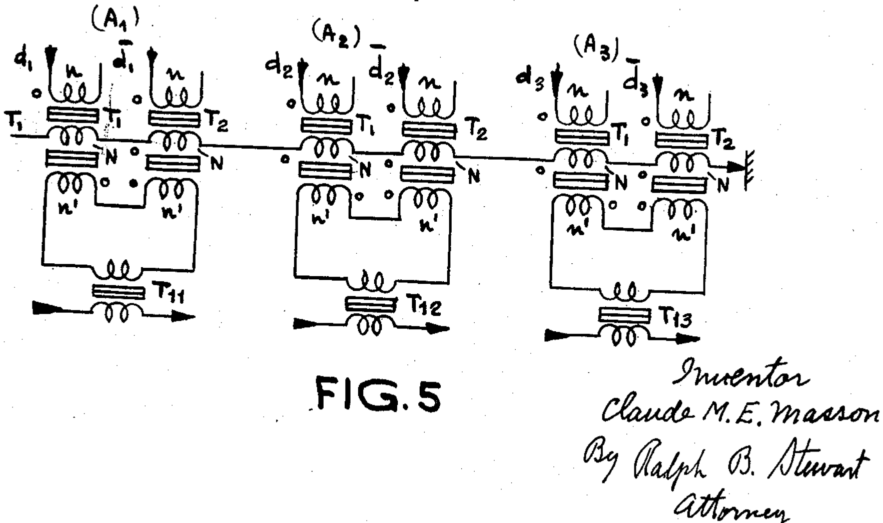

To each one of the cores of the first column is associated a switch $A_1$, to each core of the second column, a switch $A_2$, and to each core of the third column, a switch $A_3$. Each one of the switches A is of the design of FIG. 1 for which the load impedance Z is constituted by the corresponding winding of the read-in and erasing input of the corresponding core of the store. For the sake of clarity, FIG. 5 shows the first line of the store of FIG. 4 with the switches A completely shown. Across the pairs $n^1$ of output windings of the cores of these switches, are respectively connected the input windings of cores $T_{11}$, $T_{12}$ and $T_{13}$ of the row of the store. The windings N of these three switches $A_1$, $A_2$, $A_3$ are serially connected from a terminal $I_1$ for the application of the intermittent current of corresponding denomination in FIG. 4 and the ground.

Said intermittent currents $I_1$, $I_2$, $I_3$ of activation of the rows of the arrangement of FIG. 4 cannot be coincident in time since they are applied in response to a previously made, and not shown as outside the scope of the invention, decoding operation of an address of row in the store. This ensures the selection of a row either for a mere read-out operation or for an erasing and read-in operation.

For such operations, the switches $A_1$ are controlled from a digit register $R_1$, the switches $A_2$, from a register $R_2$ and the switches $A_3$, from a register $R_3$. Each register is provided with two outputs, each one of which is connected to one control winding of each switch concerned in the corresponding column. For instance, the output $d_1$ of register $R_1$ is applied, FIG. 5, to one of the control windings of the switch $A_1$ and the complementary output $\bar{d}_1$ to the other one of the control windings of said switch $A_1$; and so forth . . .

In each operation, the cycle is as follows: first a row is selected for application thereto of an activating current from its terminal I, secondly a first phase of operation erases the digital values 1 on the cores of said selected row, and thereafter, during a second phase of operation, a fresh information is recorded in parallel mode being either the old one re-read-in the cores of the row or a new one to be read-in the said row.

When register $R_1$ contains a 0, the output $d_1$ places core $T_1$ of the switches $A_1$ to $N_0$, for instance, the output $\bar{d}_1$ sets the cores $T_2$ of the said switches to N. Conversely then, when register $R_1$ contains a digit 1, the output $d_1$ sets cores $T_1$ of $A_1$ to N and the output $\bar{d}_1$, the cores $T_2$ of $A_1$ to $N_0$ and so on.

With reference to such conditions and to the above described operation of each switch, in each first phase of operation of read-out or read-in, the registers $R_1$ to $R_3$ must contain 0 so that the secondary current of the switches is of a suitable direction for bringing back to the magnetic 0 condition all the magnetic cores of the selected row when such cores mark a digital value 1. During this first phase of operation, the read-out signals are fed back to the registers from the S outputs simultaneously to the activations of these outputs. When the operation is a mere read-out, the second phase of operation comprises the resetting of those cores which had previously recorded the digital value 1, this from the conditions of the registers R. When the operation entails a new or fresh information record, then the digits of said fresh record are introduced in the registers, in substitution to the digits introduced therein during the said first phase of operation (after a reset of course). The reset and introduction of the fresh digits into the registers are made through inputs marked $i_1$ to $i_3$ to said registers $R_1$ to $R_3$.

Finally, in either cases, during the second phase, one or several of the registers $R_1$ to $R_3$ receive the digital value 1 and the switch conditions of their corresponding switches are reversed and consequently the direction of flow of the currents in the secondary circuits of the said switches. Of course, there is no reason then to provide activation currents with two phases of opposite polarities since the reversal is made in the switches when required.

The conditions of the switches in unselected rows are obviously unimportant.

What is claimed is:

1. A magnetic core device comprising a pair of magnetic cores of a material having a substantially rectangular hysteresis loop, each core having an input winding, a transfer winding, and an output winding, an output circuit connecting said output windings in series opposing relation, separate input circuits for energizing said input windings from separate sources of two-value control signals to set the magnetic condition of each core to a predetermined remanent condition in one direction or to an over-saturated condition beyond said remanent condition according to the value of the control signal in each case, and a source of intermittent current pulses for energizing said transfer windings simultaneously with the application of said control signals and in a direction opposed to said control signals, said current pulses having a value sufficient to reduce the magnetic condition of an over-saturated core to said predetermined remanent condition, and to reverse the magnetic condition of a core in the said predetermined remanent condition.

2. A device according to claim 1 and including a digit register having complementary condition outputs connected to energize the input windings of said cores respectively.

3. A magnetic core matrix store comprising, in combination, a plurality of magnetic core switches arranged in a plurality of rows and columns, each switch comprising two magnetic cores each having an input winding, a transfer winding and an output winding, an output for each switch in which the two output windings of the switch are connected in series opposition, all of the switch outputs of the columns being in series relation, individual digit registers controlled by said column outputs respectively, each register having an output connection energizing one set of input windings on the switches which control the register and also having a complementary output connection energizing the other set of input windings of said switches, separate transfer circuits connecting in series circuit relation the transfer windings of the switches in said rows respectively, and separate sources of intermittent pulses of different timing for energizing said transfer circuits respectively.

4. A matrix store according to claim 3 wherein each switch output includes a coupling transformer having primary and secondary windings, the two output windings on the two cores of each switch being connected in series opposing relation in the primary circuit of the corresponding coupling transformer, and the secondary windings of said coupling transformers being connected in series circuit relation in said column output circuit.

5. A magnetic core device comprising a plurality of pairs of magnetic cores of a material having a substantially rectangular hysteresis loop, each core of a pair being provided with three windings with corresponding windings on the two cores having the same number of turns, one of the windings of each pair being serially connected to the corresponding winding of the other core of the pair for energization by an intermittent current source, the second winding on each of the cores being connected to separate terminals for the application thereto of a distinct two-value control signal to set the magnetic condition of its core to saturation or to over-saturation according to the value of the control signal in each case, and the third windings on the respective cores being oppositely connected together into a series circuit comprising at least one current load, the intermittent current windings of all the cores being serially connected for energization by the intermittent current source simultaneously with the application of said control signals.

References Cited in the file of this patent

UNITED STATES PATENTS

| | | |
|---|---|---|
| Re. 24,614 | Haynes | Mar. 3, 1959 |
| 2,666,151 | Rajchman et al. | Jan. 12, 1954 |
| 2,805,020 | Lanning | Sept. 3, 1957 |
| 2,828,477 | Lanning | Mar. 25, 1958 |
| 2,846,667 | Goodell et al. | Aug. 5, 1958 |
| 2,889,541 | Huss et al. | June 2, 1959 |
| 2,966,663 | Leblais | Dec. 20, 1960 |